United States Patent [19]

Garrigues

[11] 4,351,511
[45] Sep. 28, 1982

[54] SEALING GASKET FOR AN OBTURATOR SUCH AS A VENTILATION REGULATOR

[75] Inventor: Jean-Claude Garrigues, Ogeu-les-Bains, France

[73] Assignee: Applications Mecanique et Robinetterie Industrielle, A.M.R.I., Paris, France

[21] Appl. No.: 196,575

[22] Filed: Oct. 14, 1980

[30] Foreign Application Priority Data

Oct. 11, 1979 [FR] France ................. 79 25365

[51] Int. Cl.³ ............................................. F16K 1/226
[52] U.S. Cl. ............................. 251/174; 251/306
[58] Field of Search ........... 49/91, 92; 98/88 L, 98/110, 121 R, 121 A, DIG. 11; 251/305, 306, 174; 137/601

[56] References Cited

U.S. PATENT DOCUMENTS

| 2,945,667 | 7/1960 | Bibbo et al. ............... 251/306 |
| 3,084,715 | 4/1963 | Scharres ..................... 251/306 |
| 3,840,208 | 10/1974 | Schudel et al. ............ 251/306 |
| 3,980,272 | 9/1976 | Nakai et al. ............... 251/306 |
| 4,038,781 | 8/1977 | Graham ........................ 49/91 |
| 4,071,220 | 1/1978 | Iino ............................. 251/174 |
| 4,077,432 | 3/1978 | Herr ............................ 251/306 |
| 4,113,231 | 9/1978 | Halpine ...................... 251/174 |
| 4,253,641 | 3/1981 | Van Ryck ................... 251/306 |
| 4,256,143 | 3/1981 | Magill et al. .............. 251/306 |

FOREIGN PATENT DOCUMENTS

| 13265 | 7/1980 | European Pat. Off. ...... 251/306 |
| 1130544 | 2/1957 | France ........................ 251/306 |
| 669902 | 10/1964 | Italy ............................. 251/305 |
| 2034442 | 6/1980 | United Kingdom ........ 251/306 |

Primary Examiner—H. Jay Spiegel
Attorney, Agent, or Firm—Scully, Scott, Murphy & Presser

[57] ABSTRACT

The invention concerns a sealing gasket comprising a housing defining a central concavity bordered by two lateral wings, an elastic support housed in the said concavity, a covering presenting a good resistance to wear and a coefficient of low friction which covers over the said concavity and comes back on the lateral wings upon which it comes to be fastened. The invention is applied especially to obturators such as fluid-tight regulator valves.

10 Claims, 14 Drawing Figures

SEALING GASKET FOR AN OBTURATOR SUCH AS A VENTILATION REGULATOR

BACKGROUND OF THE INVENTION

1. Field of the Invention

The present invention concerns a sealing gasket for an obturator such as, for example, a ventilation regulator able to serve the sectioning, in ventilation circuits, of air cooling functioning at low pressure.

2. Description of the Prior Art

It is known, in a general way, such a ventilation regulator comprises a frame of machine welded sheet iron inside of which a shutter is pivotally mounted. Because of the considerable rate of leakage tolerated in the applications of which these regulators are usually the object, the "relative" fluid-tightness is obtained by metal-to-metal contact of the shutter on the frame, the obturation being obtained by a quarter-turn rotation starting from the open position and inversely.

It is established at present that in numerous types of application, the fluid-tightness of these regulators is judged insufficient, especially but not exclusively, for safety reasons.

This is particularly the case for the ventilative installations used in nuclear power plants. It is indeed indispensable, in the case of an accidental contamination of the flow of circulated air, to hermetically close the shutters so as to circumscribe the contamination, which is hardly possible with the shutters presently utilized.

SUMMARY OF THE INVENTION

The invention has therefore for its object to improve the fluid-tightness of these regulators so that they will be totally tight for the service pressures encountered. It proposes therefore for this purpose a fluid-tightness obtained through deformation (compression) of a composite elastomer sealing gasket employing a shutter, preferably of metallic construction.

According to one embodiment of the invention the sealing gasket comprises:

(a) a structure possessing a central concavity bordered by two lateral wings;

(b) an elastic support housed in the said concavity; and, (c) a covering having a good resistance to wear and a coefficient of low friction which covers over the said concavity and comes back on the lateral wings upon which it comes to be fastened.

According to other embodiments of the invention, the abovesaid structure consists of a shaped section in a turned over ᴜ whose central core comes to be fixed, for example, by welding upon the frame of the obturator. In this case, the parts of the covering coming back on the wings of the structure come into contact on the said frame, and present at this place at least one respective autoclave edge, so as to insure a static fluid-tightness between the said covering and the said frames.

The covering can be constructed of an elastomer with a high modulus of elasticity and the elastic support of an elastomer with a low modulus of elasticity. In this case, the support can fill the concavity of the structure and present a convex free surface upon which the covering comes in support.

The elastic support can as well consist of a spiral spring constructed of plastomer or metal.

The invention concerns equally a regulator of ventilation equipped with the said sealing gasket.

Such a regulator comprises:

(a) a frame of an internal cylindrical surface able to be mounted on a ventilator shaft, for example, through fastening together;

(b) a shutter mounted pivoting in the frame by means of at least one unkeyed axis in relation to the plane of the shutter;

(c) a continuous sealing gasket of the type of those previously described and whose structure comes to be fixed by its core on the said frame, noticeably in the fluid-tight plane of the regulator.

This regulator can present the form of the shaft upon which it comes to be mounted. Consequently, it can, for example, present a square, rectangular or even a circular form.

The abovesaid shutter can be entirely metallic. The edge can then be protected either by an electrical remetallizing or by a rustproof covering able to appear under the form of a section or by any other means.

BRIEF DESCRIPTION OF THE DRAWINGS

Ways of executing the invention will be described hereafter in the manner of non-limiting examples, with reference to the attached drawings in which.

DESCRIPTION OF THE PREFERRED EMBODIMENTS

Figures 1, 2:
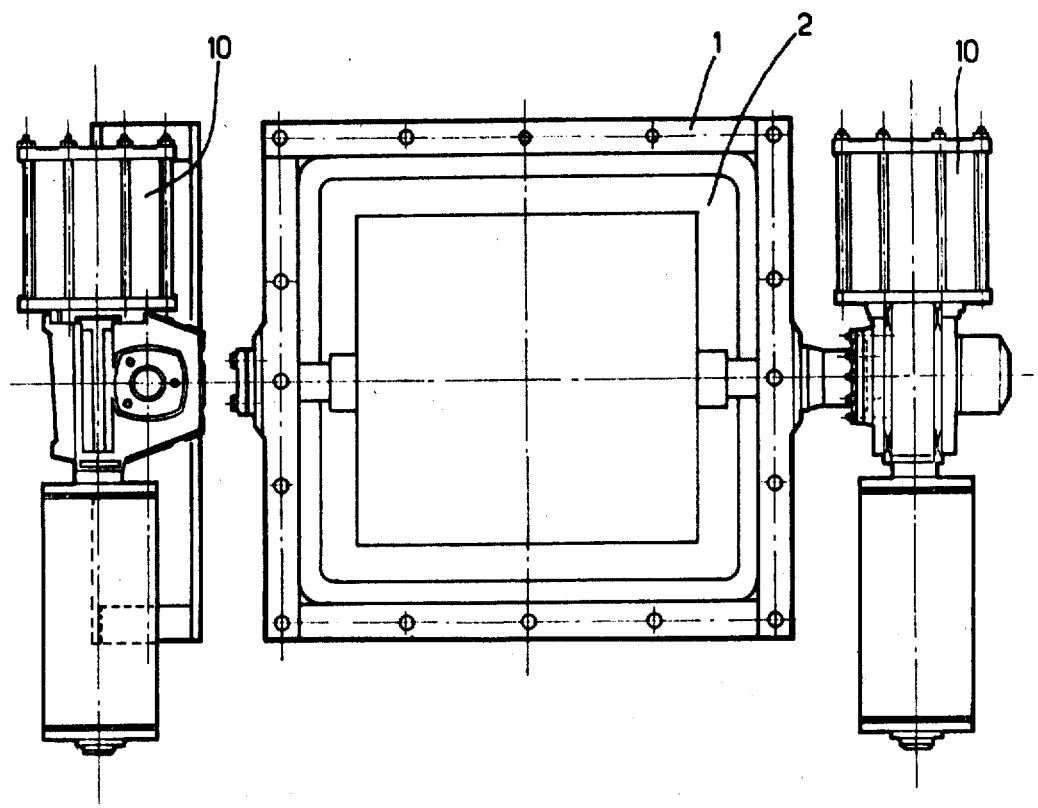
FIGS. 1 to 6 represent, in a sectional view and in a plan view, a regulator in a square form (FIGS. 1 and 2), a regulator in a rectangular form (FIGS. 3 and 4) and a regulator in a circular form (FIGS. 5 and 6)
Figures 3, 4:
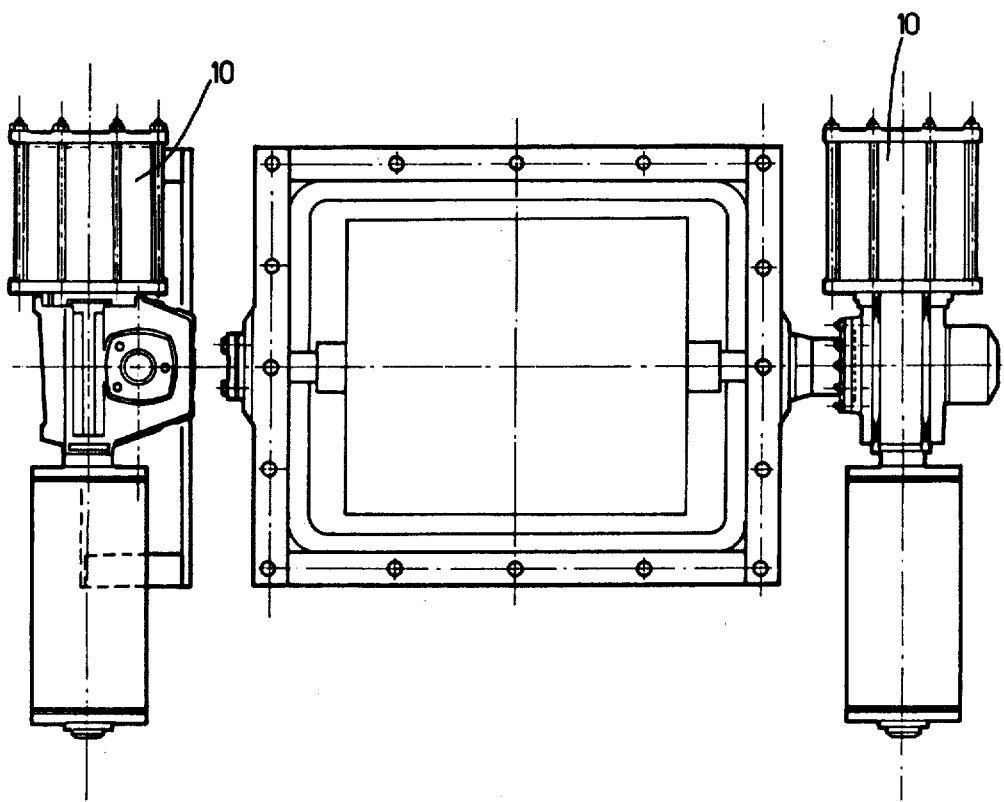
Figures 5, 6:
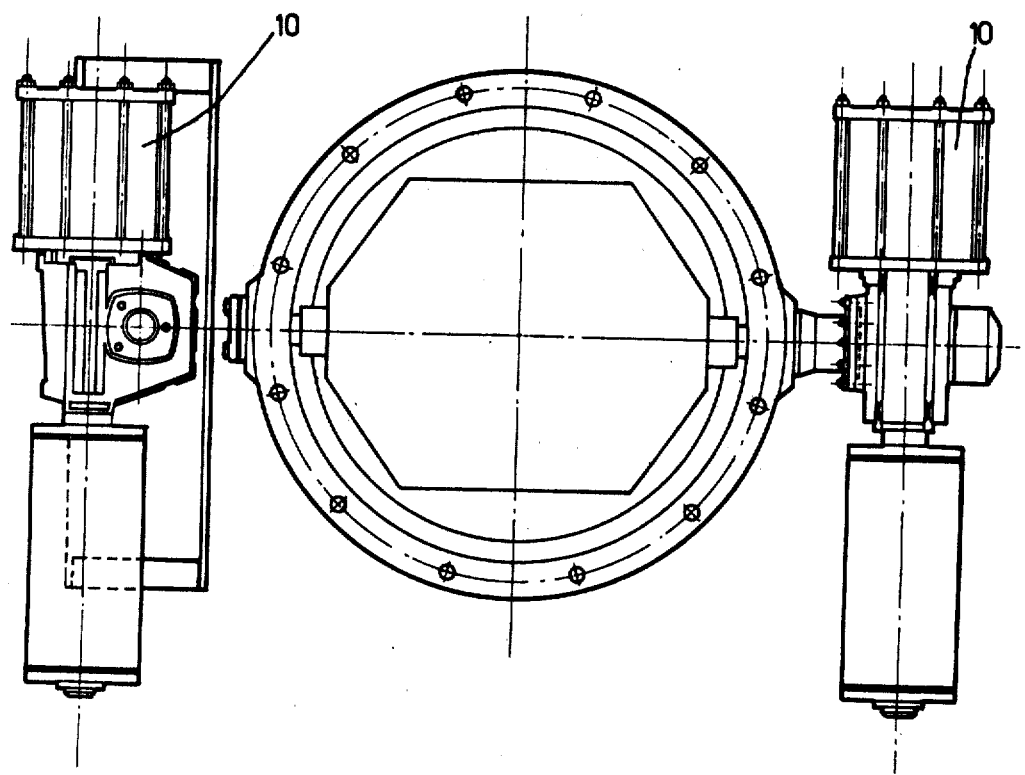
Figure 7:
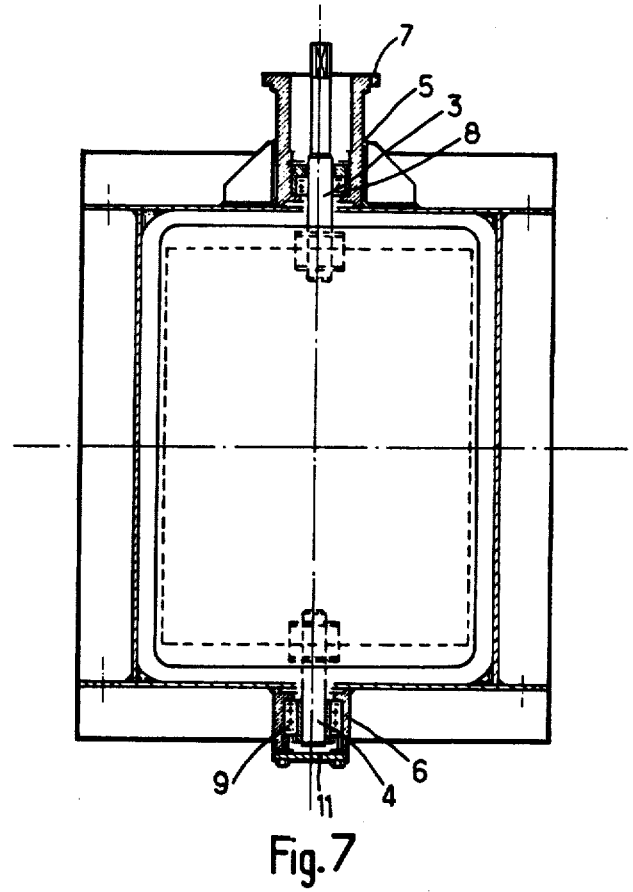
FIGS. 7 and 8 represent, respectively, in cross and axial sections, a regulator in a rectangular form.
Figure 8:
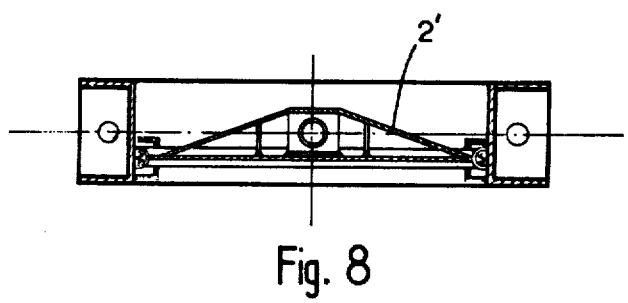

With reference to FIGS. 1 to 8, the regulators, whatever be their form (square, FIGS. 1 and 2, rectangular, FIGS. 3 and 4, circular, FIGS. 5 and 6) comprise a frame of a machine welded inner cylindrical surface 1 with a section in the form of a ᴜ into which is pivotally mounted a shutter 2, in a corresponding form, by means of two half-axes 3 and 4 of which one (axis 3) is a drive axis, and of two respective hubs 5, 6. The hub of the drive axis is equipped with a fastening platen 7 for the operating device.

Shutter 2, fabricated of machine welded sheet metal, comprises more particularly a strengthened fluid-tight sheet metal (strengthening pieces 2'). Upon the said shutter are mounted, unkeyed in relation to the plane of fluid-tightness, the two half axes of rotation 3, 4. The latter are mounted on rolling mechanisms 8, 9 in hubs 5,6 of the said frame. In the examples shown in FIGS. 1 to 6, the half axis of drive 3 is driven by an actuator 10 of a standard type and which will therefore not be described in detail.

Hub 6 relative to half-axis 4 is protected by a lid 11 made fluid-tight, for example, owing to toric joints.

Figure 9:
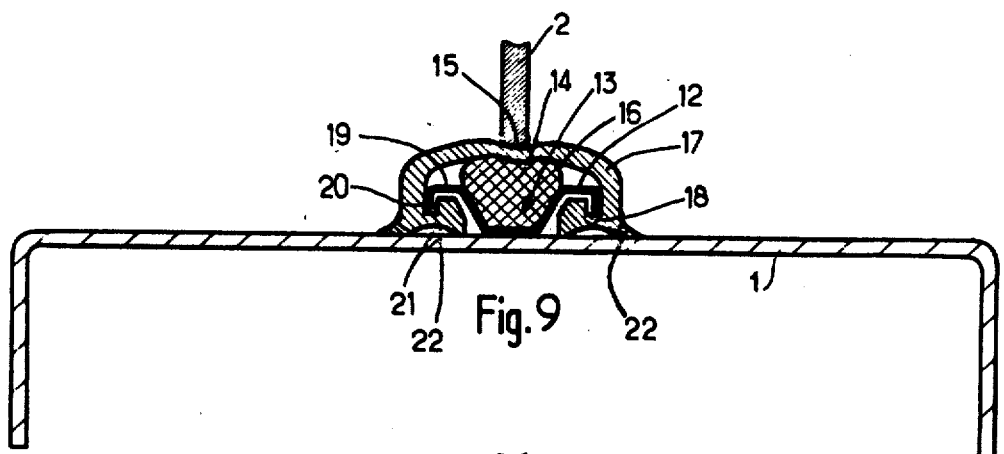
FIGS. 9 and 10 represent, in a partial section, a regulator frame equipped with an elastomer support joint (FIG. 9) and a spiral spring joint (FIG. 10); and, FIGS. 11 to 14 represent shutter edges protected by rustproof deposits.
Figure 10:
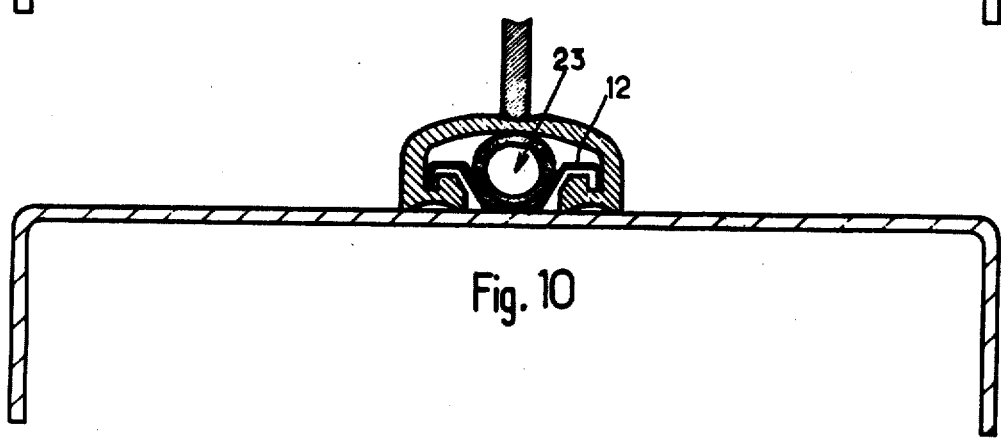

As shown in FIGS. 9 and 10, the structure 12 of the joint according to the present invention comes to be fixed, for example, by spot welding, on frame 1, noticeably in the plane of fluid-tightness of the regulator, which is found, as previously mentioned, unkeyed in relation to the half-axes 3, 4. It will be noted that for regulators having a square or rectangular section, the inner form of this frame 1 and, accordingly of the joint unit, is rounded at the corners.

This structure 12, which is realized with the help of a section in the form of an inverted ⊥, receives, in its concavity 13, a support 14 which is made of an elastomer with a low modulus of elasticity intended to insure the elasticity or the restoration of the seat at the time of the penetration or the pullback of the edge 15 of shutter 2.

In the example shown in FIG. 9, the support 14 fills the concavity 13 of the structure 12 and presents a bulged upper face 16 at rest.

The unit made up by structure 12 and support 14 is covered over by an elastomer covering 17 with a high modulus, in the form of an inverted C, whose lateral edges 18 come back under lateral wings 19 of structure 12. This last arrangement makes it possible to realize the hooking-up of covering 17 on structure 12. This hitching-on is reinforced owing to the fact that wings 19 of the structure are extended by a slight fold 20 which comes to fit, by a ratchet mechanism, on corresponding lateral grooves 21 of the back part 18 of covering 17.

The static fluid-tightness, between the covering 17 and the frame 1, is insured in providing, in the parts of covering 17 coming back on the wings 19 of the section and which come to bring on the frame 1, autoclave edges.

It will be noted that the elastomer used for the manufacture of covering 17 must, in addition, present a good mechanical resistance (friction, wear) to the contact of edge 15 of shutter 2.

Besides, the axial regulation of shutter 2, in relation to the seat previously described, is carried out by transmission of axis 4 in rolling mechanism 9 housed in the hub 6.

The invention is not limited to the type of support shown in FIG. 9. It could consist, for example, of a spiral spring of plastomer or metal (FIG. 10).

The functioning of the regulators previously described is very close to that of a standard butterfly-valve. In a similar fashion, the complete operation of the shutter, from the opening to the closing, corresponds to a complete rotation of 90° around the axes. Likewise, the up-down fluid-tightness is obtained at the end of the closing by a continuous compression of the shutter's edge on the seat and whose type can vary according to the position of edge 15 of shutter 2 in relation to its axis of rotation (half-axes 3, 4). This action is shown, in any case, on the one hand, in a penetration of edge 15 of shutter 2 in the seat, parallel to the axis of rotation and, on the other hand, in a sliding of edge 15 on the seat, perpendicular to the said axis of rotation.

For this effect, the conception of covering 17 is such that its exterior form allows a progressive engagement in one direction as in the other of the edge 15 of shutter 2, whereas its flexibility makes it possible to absorb, without notable increase of the compression and therefore of the friction, the dimensional differences due to a construction in machine welded sheet-metal.

Figure 11:
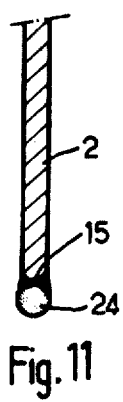
Figure 12:
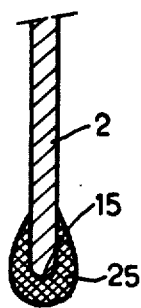
Figure 13:
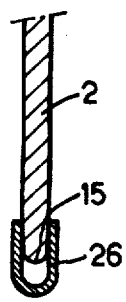
Figure 14:
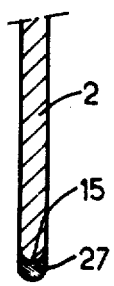

With reference to FIGS. 11, 12, 13 and 14, edge 15 of shutter 2 can be protected by a rustproof deposit consisting:

of a ring 24 of stainless steel welded on the edge of shutter 2 (FIG. 11);

of a section 25 of plastomer adhered to the edge of shutter 2 (FIG. 12);

of a section 26 of stainless steel fixed by continuous welding or by adhesion to the edge of shutter 2 (FIG. 13);

of a remetallizing 27 of stainless steel carried out on the edge of shutter 2 (FIG. 13).

What is claimed is:

1. A sealing gasket especially for an obturator utilized in a fluid-tight regulator valve, comprising:
   a. a frame structure having a central core, with a central concavity therein, said core being mountable to the frame of an obturator;
   b. said frame structure having lateral wings which have an upwardly extending portion, said wings further having a portion thereof extending in a direction outwardly from said core and substantially transverse to said upwardly extending portions, said transverse portion further having end portions which downwardly extend therefrom;
   c. a covering placed over the core and on said lateral wings, said covering having lateral edges which circumscribe and thereby grip the downwardly extending portions of said lateral wings so as to provide an effective seal between said covering and said lateral wings;
   d. an elastic support placed in said central core between said core, lateral wings and said covering, said elastic support providing resilient support to said covering.

2. Sealing gasket according to claim 1, wherein said lateral edges of the covering which circumscribe the wings of the frame structure are positioned between and are in contact with said downwardly extending end portions of said frame structure and said frame, thereby providing at least one respective autoclave edge so as to insure a static fluid-tightness between the said covering and the said frame.

3. Sealing gasket according to claim 1 wherein said covering is constructed of an elastomer having a high modulus of elasticity and the elastic support is constructed of an elastomer having a low modulus of elasticity.

4. Sealing gasket according to claim 3, wherein the support fills the central concavity of the structure so as to be slightly compressed to provide a convex surface on said covering.

5. Sealing gasket according to claim 1, wherein the support comprises a spiral spring of plastomer or metal.

6. Sealing gasket according to claim 1, wherein said gasket provides a continuous fluid-tightness in a regulator having a square, rectangular or circular form.

7. A sealing gasket, especially for a regulator of ventilation, according to claim 1, which comprises:
   a. a frame structure capable of being mounted on a ventilator shaft;
   b. a shutter pivotably mounted in the frame by means of at least one unkeyed axis in relation to the plane of the shutter; and
   c. a continuous sealing gasket whose form permits the engagement of the shutter with said gasket and whose structure is fixed by its core on the said frame, said gasket being positioned substantially in the plane of the regulator.

8. A sealing gasket according to claim 7, wherein the regulator is in the form of the shaft wherein it can be mounted.

9. A sealing gasket according to claim 8, wherein the said shutter is entirely metallic and said shutter has a protectable edge, which is covered by electric remetallizing.

10. A sealing gasket according to claim 8, wherein said shutter has a protectable edge which is covered by a rustproof covering.

* * * * *